(12) United States Patent
Bornmann et al.

(10) Patent No.: US 7,159,844 B2
(45) Date of Patent: Jan. 9, 2007

(54) TWO-PART FLAP VALVE

(75) Inventors: Gerd Bornmann, Hochheim (DE); Peter Kohlen, Neu Anspach (DE); Michael Rennen, Bad Soden (DE)

(73) Assignee: Siemens AG, München (DE)

( * ) Notice: Subject to any disclaimer, the term of this patent is extended or adjusted under 35 U.S.C. 154(b) by 86 days.

(21) Appl. No.: 10/538,757

(22) PCT Filed: Dec. 16, 2003

(86) PCT No.: PCT/DE03/04154

§ 371 (c)(1), (2), (4) Date: Jun. 10, 2005

(87) PCT Pub. No.: WO2004/057219

PCT Pub. Date: Jul. 8, 2004

(65) Prior Publication Data

US 2006/0060809 A1 Mar. 23, 2006

(30) Foreign Application Priority Data

Dec. 20, 2002 (DE) ................. 102 60 252

(51) Int. Cl.
F16K 1/228 (2006.01)
(52) U.S. Cl. ..................... 251/192; 251/307
(58) Field of Classification Search .............. 251/192, 251/180, 305–308
See application file for complete search history.

(56) References Cited

U.S. PATENT DOCUMENTS

| 2,059,656 | A | * | 11/1936 | Ring ........................ 251/368 |
| 2,840,338 | A | * | 6/1958 | Shaw ....................... 251/306 |
| 3,578,287 | A | | 5/1971 | Salerno et al. |
| 3,656,770 | A | | 4/1972 | Hoffmann |
| 3,784,215 | A | * | 1/1974 | Ruthenberg ............... 251/306 |
| 4,003,394 | A | | 1/1977 | Adams |
| 4,076,034 | A | | 2/1978 | Adams |
| 4,632,360 | A | * | 12/1986 | DeSalve ..................... 251/307 |
| 4,683,102 | A | | 7/1987 | Martin et al. |
| 4,899,984 | A | * | 2/1990 | Strickler et al. ........... 251/306 |
| 5,039,116 | A | | 8/1991 | Maeda |
| 5,326,077 | A | | 7/1994 | Spencer et al. |
| 6,439,255 | B1 | * | 8/2002 | Chamberlain ............... 251/175 |
| 6,604,516 | B1 | | 8/2003 | Krimmer et al. |
| 6,739,579 | B1 | * | 5/2004 | Rim .......................... 251/306 |
| 7,007,926 | B1 | * | 3/2006 | Kohlen et al. ............. 251/306 |

FOREIGN PATENT DOCUMENTS

DE  1 955 707     9/1970
DE  24 43 723 A1  4/1976

(Continued)

OTHER PUBLICATIONS

Derwent Abstract—DE 34 22 129 C2 Jan. 17, 1985 Framatome & Cie., Courbevoie, FRANCE.

(Continued)

Primary Examiner—John Bastianelli
(74) Attorney, Agent, or Firm—Siemens AG

(57) ABSTRACT

A valve having a housing with a valve seat for a two-piece flap which is rotatably mounted on a drive shaft. An annular piston seal and an adjacent cover disk are disposed between the first part and the second part of the two-piece flap so as to revolve there-around. The diameter of the cover disk is smaller than the diameter of the annular piston seal which is embodied as a metal ring that is provided with a gap. The invention also relates to the use of said valve as a gas recirculation valve.

6 Claims, 2 Drawing Sheets

Detail A

FOREIGN PATENT DOCUMENTS

| | | |
|---|---|---|
| DE | 25 48 778 A1 | 5/1977 |
| DE | GM 77 22 015 | 10/1977 |
| DE | 34 22 129 C2 | 1/1985 |
| DE | 38 00 705 A1 | 8/1989 |
| DE | 199 34 113 A1 | 1/2001 |
| EP | 1 096 180 A2 | 5/2001 |
| GB | 1004370 | 9/1965 |

OTHER PUBLICATIONS

Derwent Abstract—DE 199 34 113 A1 Jan. 25, 2001 Robert Bosch GmbH, 70469 Stuttgart, GERMANY.

Derwent Abstract—DE 38 00 705 A1 Aug. 10, 1989 Th. Jansen GmbH, 6670 St. Ingbert, GERMANY.

Abstract—DE 25 48 778 A1 May 12, 1977 Ewald Hartmann, 5000 Köln, GERMANY.

Abstract—DE 24 43 723 A1 Apr. 1, 1976 Gebr. Adams, 4630 Bochum, GERMANY.

Asbtract—DE 1 955 707 Sep. 3, 1970 Vapor Corp., Chicago, USA.

Abstract—GM 77 22 015 Oct. 20, 1977 Polysius AG, 4723 Neubeckum, GERMANY.

\* cited by examiner

Detail A

TWO-PART FLAP VALVE

BACKGROUND OF THE INVENTION

The invention relates to a valve and to the use of the valve. Valves, for example for gas channels, are known. They often comprise a housing having a valve seat in which a rotatably arranged flap for closing the gas channel is arranged. In order to avoid leakage air, the flap is provided here with an outwardly circumferential piston seal. The latter as a rule comprises a metal ring which has a gap for reasons of compliance. During operation, the result is the disadvantage that this gap can often not be closed completely, with the result that leakage air is guided through said gap, which is not desirable.

SUMMARY OF THE INVENTION

The invention is therefore based on the object of providing a valve, in which the formation of leakage air can be largely avoided. Reliable closure of the gas channel is thus also to be largely ensured at relatively high and varying temperatures of the gas.

The object on which the invention is based is achieved by a valve which comprises a housing having a valve seat for a two-part flap which is mounted rotatably on a drive shaft, in which a piston sealing ring and a cover disk are arranged adjacently and outwardly circumferentially between the first part and the second part of the two-part flap, the diameter of the cover disk being smaller than the diameter of the piston sealing ring which is configured as a metal ring with a gap. Here, the valve seat itself can be, for example, a part of the housing. The flap is as a rule of circular configuration and consists of, for example, steel. It is of two-part configuration, in order that the cover disk which has the shape of a washer can be positioned between the first part and the second part of the two-part flap. The first part and the second part can be, for example, of circular and disk-shaped configuration. The first part can be connected to the second part of the two-part flap, for example, by screwing, riveting or welding. Here, it can be helpful during welding to arrange an intermediate piece made from metal between the first part and the second part. In some cases, it is also possible to adhesively bond the first part to the second part. The piston sealing ring is configured as a flat metal ring. It has a gap which is also referred to as joint play and makes flexible compliance of the piston sealing ring possible in the valve seat. The diameter of the cover disk is configured to be smaller than the diameter of the piston sealing ring. This advantageously achieves the situation where the cover disk cannot become jammed in the valve seat. It has been shown surprisingly that the formation of leakage air can be largely avoided as long as the gap of the piston sealing ring is sealed almost completely by the cover disk which is arranged adjacently. This advantageously prevents it being possible for leakage air to be guided through the gap of the piston sealing ring. This is particularly advantageous if the gases which are to be passed through the valve have relatively high temperatures which vary in a pronounced manner.

One preferred refinement of the invention consists in that the diameter of the cover disk is smaller by from 0.1 to 0.2 mm than the diameter of the piston sealing ring. As a result, the combination of the advantages "avoidance of leakage air" and "avoidance of the cover disk becoming jammed" is optimized.

According to a further preferred refinement of the invention, the first part and the second part of the two-part flap are configured identically and as circular cylinders having a circularly limited projection which is arranged on a transverse side of the circular cylinder. Here, the circularly limited projection is likewise configured as a flat circular cylinder and thus has the shape of a disk. The first part and the second part are advantageously manufactured as a single part with the respective circularly limited projection. Here, it is advantageous that the first part and the second part can be manufactured according to exactly the same manufacturing process. Moreover, the shape of the circular cylinder, the first part and the second part in each case being aligned with its one end face, makes it possible to connect the first part to the second part relatively simply by welding.

A further preferred refinement of the invention consists in that the first part or the second part of the two-part flap which is immediately adjacent to the cover disk has cut-outs which are arranged adjacently on its outer edge. Said cut-outs can be limited, for example, semicircularly in plan view. During operation, contamination occurs as a rule between the piston sealing ring and the first part or the second part of the two-part flap, caused by abrasion between the individual parts or by impurities in the gases. This contamination has to be removed automatically. The arrangement of the cut-outs makes it possible to discharge said contaminants to the outside, with the result that relatively satisfactory sealing of the valve is also ensured after relatively long service times.

According to a further refinement of the invention, the cut-outs extend in a parabola shape as seen in plan view. Here, it is advantageous that the contaminants can be discharged relatively quickly, with the result that relatively large accumulations of contaminants can be avoided from the beginning.

A further preferred refinement of the invention consists in that the cover disk has a serrated profile extending inwardly. Here, for example, resilient serrated disks according to DIN 6797 or DIN 5461 can be used as cover disk. This advantageously makes it easier to additionally discharge contaminants via the cover disk.

Finally, the subject matter of the invention is also the use of the valve as a gas recirculation valve of a motor vehicle. The gases which are passed through a gas recirculation valve of a motor vehicle as a rule have high temperatures and high temperature variations. Here, the formation of leakage air is to be avoided, with the result that the use of the valve according to the invention is to be seen here as particularly advantageous.

BRIEF DESCRIPTION OF THE SEVERAL VIEWS OF THE DRAWINGS

The invention will be explained in greater detail and by way of example in the following text using the drawing (FIG. 1 to FIG. 5).

DETAILED DESCRIPTION OF THE INVENTION

Figure 1:
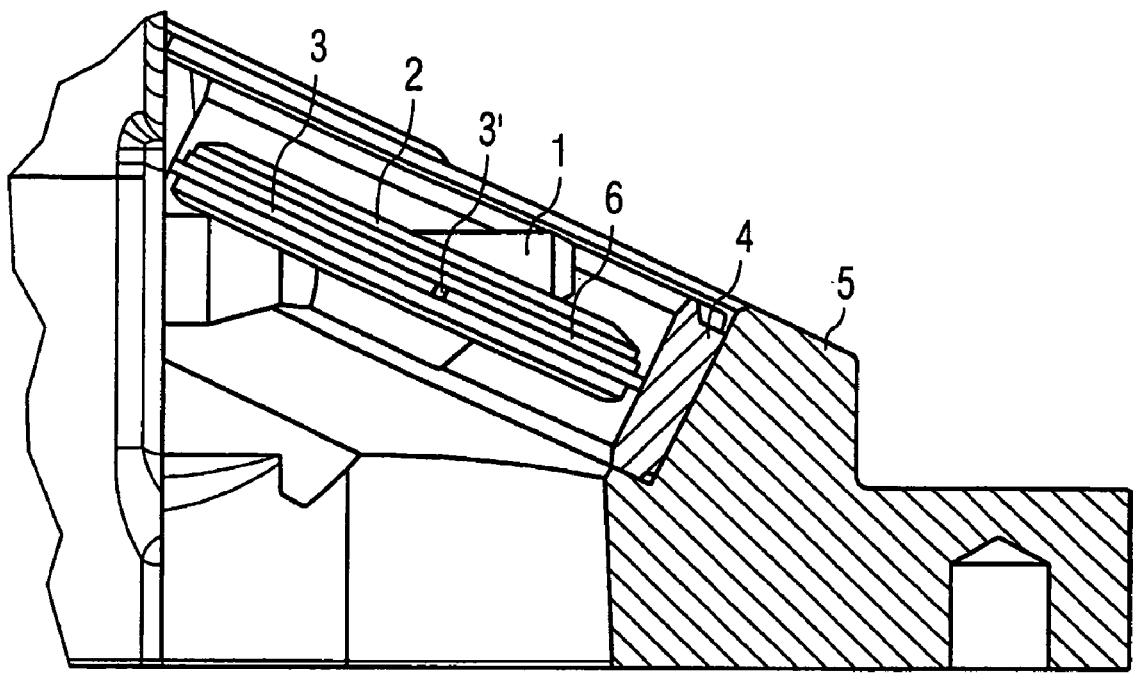
FIG. 1 shows the valve in cross section.

FIG. 1 shows the valve in cross section in a diagrammatic and simplified form. The valve comprises a housing 5 having a valve seat 4 for a two-part flap 2 which is mounted rotatably on a drive shaft 1. A piston sealing ring 3 and a cover disk 6 are arranged adjacently around the two-part flap 2, the diameter of the cover disk 6 being smaller than the diameter of the piston sealing ring 3 which is configured as a metal ring with a gap 3'. In a particularly advantageous manner, the diameter of the cover disk 6 is smaller by from 0.1 to 0.2 mm than the diameter of the piston sealing ring 3. The arrangement of the cover disk 6 largely prevents it being possible for leakage air to pass from one side of the two-part flap 2 via the gap 3' of the piston sealing ring 3 to the other side of the two-part flap 2, and vice versa. This is prevented by almost complete closure of the gap 3' by the cover disk 6 which is arranged adjacently.

Figure 2:
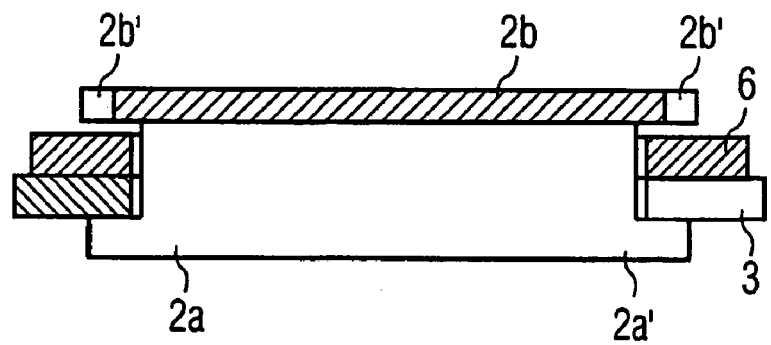
FIG. 2 shows the two-part flap in cross section, with the cover disk and the piston sealing ring in a diagrammatically simplified form.

FIG. 2 shows a two-part flap in cross section in a diagrammatic and simplified form. The two-part flap comprises a first part 2a and a second part 2b. The first part 2a is configured as a circular cylinder having a circularly limited projection 2a' which is arranged on a transverse side of the circular cylinder, the first part 2a and the circular projection 2a' being composed of a single part. The second part 2b of the two-part flap has the shape of a circular disk. The first part 2a and the second part 2b of the two-part flap can be connected to one another, for example, by welding. The second part 2b which is immediately adjacent to the cover disk has cut-outs 2b, arranged adjacently on its outer edge. They serve to discharge contaminants which are formed during operation between the piston sealing ring 3 and the first part 2a of the two-part flap. As a rule, it is particularly advantageous to manufacture both the first part 2a and the second part 2b of the two-part flap identically as circular cylinders having a circularly limited projection 2a' which is arranged on the transverse side of the circular cylinder (not shown), which in general simplifies the manufacture of the valve.

Figure 3:
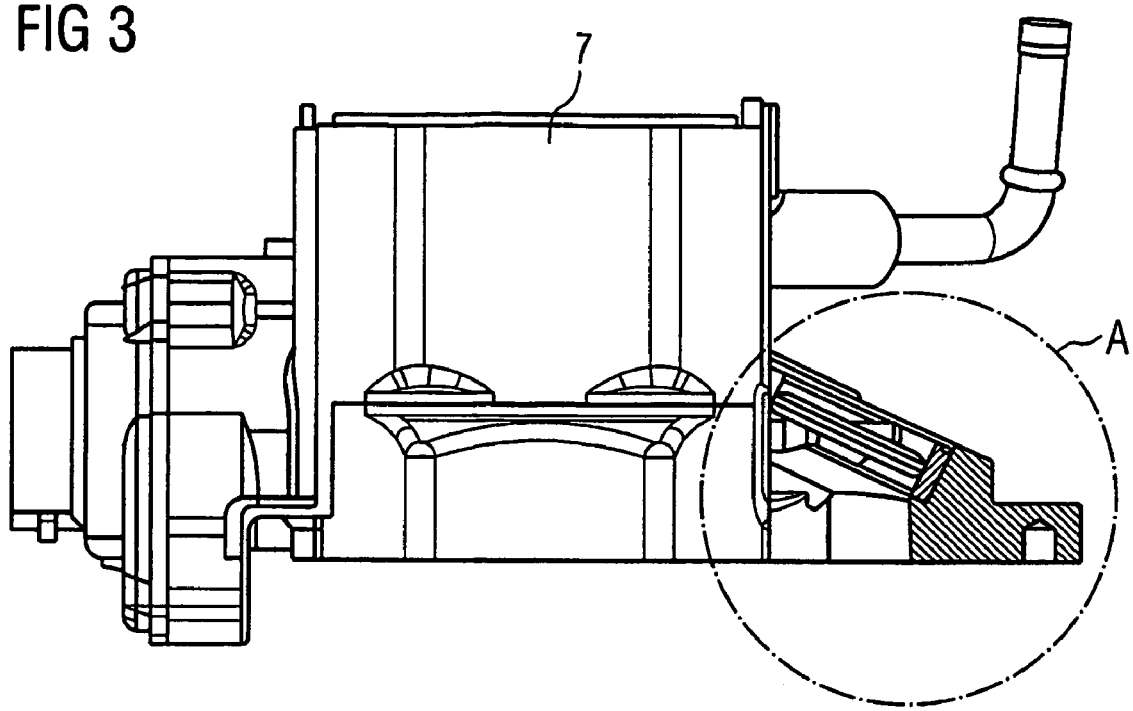
FIG. 3 shows the arrangement of the valve as a gas recirculation valve in a motor vehicle, according to detail A in FIG. 1.

FIG. 3 shows the valve according to detail A in FIG. 1, as a gas recirculation valve. The valve which is arranged as a gas recirculation valve is situated directly next to the fresh-air duct 7, to which the exhaust gases of the motor vehicle are partially passed via the valve.

Figure 4:
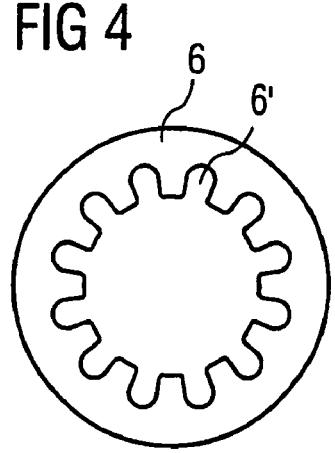
FIG. 4 shows the plan view of a cover disk.

FIG. 4 shows a cover disk 6 in plan view. The cover disk 6 has a serrated profile 6' extending inwardly. The arrangement of a serrated profile 6' of this type in the cover disk additionally makes it easier to discharge contaminants which are formed.

Figure 5:
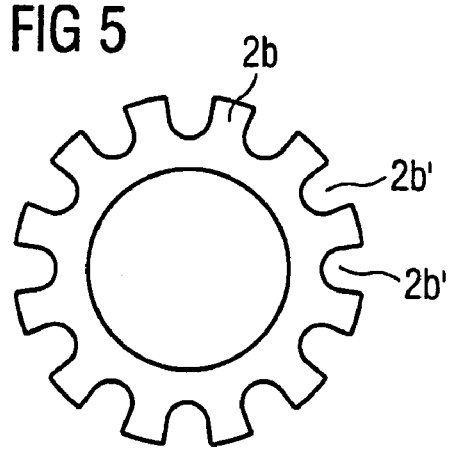
FIG. 5 shows the plan view of a second part of the two-part flap.

FIG. 5 shows a second part 2b of the two-part flap 2 in plan view. Here, adjacently arranged cut-outs 2b' are arranged on its outer edge, which cut-outs 2b' extend in a parabola shape in plan view. Contaminants can be discharged relatively rapidly through them.

The invention claimed is:

1. A valve, comprising:
   a housing;
   a valve seat for a two-part flap arranged within the housing and rotatably mounted on a drive shaft, wherein a piston sealing ring and a cover disk are arranged adjacently and outwardly circumferentially between a first part and a second part of the two-part flap, such that the diameter of the cover disk is smaller than the diameter of the piston sealing ring which is configured as a metal ring with a gap.

2. The valve according to claim 1, wherein the diameter of the cover disk is smaller by from 0.1 to 0.2 mm than the diameter of the piston sealing ring.

3. The valve according to claim 1, wherein the first part and the second part of the two-part flap are configured identically and as circular cylinders having a circularly limited projection which is arranged on a transverse side of the circular cylinder.

4. The valve according to claim 1, wherein the first part or the second part of the two-part flap which is immediately adjacent to the cover disk comprises cut-outs arranged adjacently on its outer edge.

5. The valve according to claim 4, wherein the cut-outs extend in a parabola shape with respect to a plan view.

6. The valve according to claim 1, wherein the cover disk comprises a serrated profile extending inwardly.

* * * * *